United States Patent
Wheatley et al.

(10) Patent No.: US 8,518,510 B1
(45) Date of Patent: *Aug. 27, 2013

(54) FRICTION PAD ON PORTABLE HANDHELD ELECTRONIC DEVICE

(75) Inventors: Alan J. Wheatley, Draper, UT (US); Bryce Craig, Alpine, UT (US)

(73) Assignee: American Covers, Inc., Bluffdale (*) Notice: Subject to any disclaimer, the term of this patent is extended or adjusted under 35 U.S.C. 154(b) by 297 days.

This patent is subject to a terminal disclaimer.

(21) Appl. No.: 12/979,601

(22) Filed: Dec. 28, 2010

Related U.S. Application Data

(60) Provisional application No. 61/290,615, filed on Dec. 29, 2009, provisional application No. 61/371,853, filed on Aug. 9, 2010.

(51) Int. Cl.
*B32B 3/30* (2006.01)
*B32B 7/12* (2006.01)
*B32B 27/40* (2006.01)
*B60R 7/06* (2006.01)
*B23P 17/04* (2006.01)

(52) U.S. Cl.
USPC .......... 428/40.1; 428/42.1; 428/160; 428/343; 428/423.1

(58) Field of Classification Search
USPC ............... 428/40.1, 42.1, 160, 343, 423.1
See application file for complete search history.

(56) References Cited

U.S. PATENT DOCUMENTS

| | | |
|---|---|---|
| 2,128,118 A | 7/1937 | Burford |
| 2,243,554 A | 5/1941 | Epstein |
| 2,466,502 A | 4/1949 | Stiller |
| 2,573,323 A | 10/1951 | Eshelman |
| 2,642,248 A | 6/1953 | Semon |
| 2,762,868 A | 9/1956 | Wandel |
| 2,931,489 A | 4/1960 | Farnholtz |
| 3,445,135 A | 5/1969 | Masi |
| 3,552,632 A | 1/1971 | Wilson |
| 3,567,871 A | 3/1971 | Walter |
| 3,654,047 A | 4/1972 | Berkowitz |
| 3,937,491 A | 2/1976 | Hilding |

(Continued)

FOREIGN PATENT DOCUMENTS

| | | |
|---|---|---|
| WO | WO 02/35975 | 5/2002 |
| ZA | 20004637 | 9/2000 |

OTHER PUBLICATIONS

U.S. Appl. No. 13/045,057, filed Mar. 10, 2011; Alan J. Wheatley; office action issued Jun. 3, 2011.

(Continued)

*Primary Examiner* — Thao T. Tran
(74) *Attorney, Agent, or Firm* — Thorpe North & Western LLP

(57) ABSTRACT

A frictional pad in combination with a handheld electronic device upon which the frictional pad is adhered and an upward facing support surface upon which the handheld electronic device is selectively disposed and held in a non-adhesive, non-slip fashion by the frictional pad. The frictional pad includes a polyurethane dome adhered to the handheld electronic device by the adhesive film. The dome has a broad, flat shape with an outfacing surface facing the upward facing support surface with a flat and smooth center parallel with the adhesive film and surrounded by a radius perimeter. The outfacing surface of the dome contacts the upward facing support surface and is tacky to releasably hold the handheld electronic device to the upward facing support surface.

25 Claims, 2 Drawing Sheets

(56) References Cited

U.S. PATENT DOCUMENTS

| | | | |
|---|---|---|---|
| 4,026,033 A | 5/1977 | Martin | |
| 4,335,773 A | 6/1982 | Masi | |
| 4,358,488 A | 11/1982 | Dunklin et al. | |
| D278,057 S | 3/1985 | McMaster | |
| 4,528,232 A | 7/1985 | Cliffe | |
| 4,749,222 A | 6/1988 | Idland | |
| 4,759,058 A | 7/1988 | Sutton | |
| 4,815,515 A | 3/1989 | Lee | |
| 4,817,139 A | 3/1989 | Russo | |
| 4,846,382 A | 7/1989 | Foultner et al. | |
| 4,862,944 A | 9/1989 | Hendershot | |
| D308,062 S | 5/1990 | Leoni et al. | |
| 4,944,311 A | 7/1990 | Eldridge, Jr. et al. | |
| 4,967,988 A | 11/1990 | Nguyen | |
| 4,986,496 A | 1/1991 | Marentic et al. | |
| 5,036,866 A | 8/1991 | Eldrige, Jr. et al. | |
| D323,828 S | 2/1992 | Martinsen et al. | |
| 5,174,607 A | 12/1992 | Hill | |
| D350,356 S | 9/1994 | Wood | |
| 5,358,094 A | 10/1994 | Molinaro | |
| 5,508,084 A | 4/1996 | Reeves et al. | |
| 5,542,637 A | 8/1996 | Schriner | |
| 5,593,769 A | 1/1997 | Wolf et al. | |
| 5,599,617 A | 2/1997 | Ewald | |
| 5,638,249 A | 6/1997 | Rubino | |
| 5,692,815 A | 12/1997 | Murphy | |
| 5,725,152 A | 3/1998 | Akyu | |
| 2,794,767 A | 8/1998 | Wilson | |
| 5,794,767 A | 8/1998 | Wilson | |
| 5,829,507 A | 11/1998 | Pawlowski | |
| 5,899,010 A | 5/1999 | Peck | |
| 6,089,516 A | 7/2000 | Yates | |
| 6,117,526 A | 9/2000 | Marks | |
| 6,164,213 A | 12/2000 | Topps et al. | |
| 6,206,260 B1 | 3/2001 | Covell et al. | |
| 6,246,764 B1 | 6/2001 | Owen et al. | |
| D449,043 S | 10/2001 | Chow et al. | |
| D449,831 S | 10/2001 | Chow | |
| D453,017 S | 1/2002 | Gledhill | |
| 6,372,323 B1 | 4/2002 | Kobe et al. | |
| 6,391,398 B1 | 5/2002 | Pesu et al. | |
| 6,461,709 B1 | 10/2002 | Janssen | |
| 6,506,271 B1 | 1/2003 | Yates | |
| 6,535,606 B2 | 3/2003 | Cox | |
| 6,561,378 B1 | 5/2003 | Roessler et al. | |
| 6,598,653 B1 | 7/2003 | Gonzalez | |
| 6,610,382 B1 | 8/2003 | Kobe et al. | |
| 6,618,970 B1 | 9/2003 | Fillman et al. | |
| 6,640,477 B1 | 11/2003 | Timpson et al. | |
| 6,672,622 B2 | 1/2004 | Barron | |
| 6,673,409 B1 | 1/2004 | Wheatley | |
| 6,830,733 B2 | 12/2004 | Stanley, III | |
| 6,935,659 B1 | 8/2005 | Weaver | |
| 7,125,602 B2 | 10/2006 | Wheatley | |
| 7,159,792 B2 | 1/2007 | Wheatley | |
| 7,252,867 B2 | 8/2007 | Wheatley | |
| D555,571 S | 11/2007 | Eskandry | |
| 7,293,719 B2 * | 11/2007 | Wheatley et al. | 239/56 |
| D573,075 S | 7/2008 | Eskandry | |
| 7,910,188 B2 | 3/2011 | Wheatley | |
| 7,923,088 B2 | 4/2011 | Wheatley | |
| 2001/0051234 A1 | 12/2001 | Ryan et al. | |
| 2002/0119292 A1 | 8/2002 | Venkatasanthanam et al. | |
| 2004/0084492 A1 | 5/2004 | Wheatley | |
| 2004/0197221 A1 | 10/2004 | Stanley, III | |
| 2005/0084413 A1 | 4/2005 | Stanley, III | |
| 2005/0169793 A1 * | 8/2005 | Wheatley et al. | 422/5 |
| 2005/0199668 A1 | 9/2005 | Wheatley | |
| 2005/0271847 A1 | 12/2005 | Antonini | |
| 2006/0121250 A1 | 6/2006 | Wheatley | |
| 2006/0154029 A1 | 7/2006 | Antonini | |
| 2006/0196964 A1 * | 9/2006 | Wheatley et al. | 239/57 |
| 2006/0198978 A1 | 9/2006 | Antonini | |
| 2007/0231508 A1 | 10/2007 | Fand et al. | |
| 2008/0311315 A1 | 12/2008 | Marlow | |
| 2008/0311316 A1 | 12/2008 | Marlow | |
| 2009/0004420 A1 | 1/2009 | Wheatley | |
| 2009/0072045 A1 * | 3/2009 | Wheatley et al. | 239/56 |
| 2010/0001151 A1 | 1/2010 | Wheatley | |
| 2010/0065654 A1 * | 3/2010 | Wheatley et al. | 239/56 |
| 2011/0155884 A1 | 6/2011 | Wheatley | |
| 2011/0165383 A1 | 7/2011 | Wheatley | |

OTHER PUBLICATIONS

U.S. Appl. No. 13/045,057, filed Mar. 10, 2011; Alan J. Wheatley; Notice of Allowance issued Oct. 14, 2012.

U.S. Appl. No. 13/045,094, filed Mar. 10, 2011; Alan J. Wheatley; Notice of Allowance issued Oct. 17, 2011.

U.S. Appl. No. 12/979,690, filed Dec. 28, 2010; Alan J. Wheatley; office action dated Mar. 1, 2013.

U.S. Appl. No. 12/987,662, filed Jan. 10, 2011; Alan J. Wheatley; office action dated Mar. 21, 2013.

U.S. Appl. No. 29/435,389, filed Oct. 23, 2012; Aaron Irvin; notice of allowance dated Mar. 1, 2013.

U.S. Appl. No. 13/009,574, filed Jan. 19, 2011; Alan Wheatley; notice of allowance dated Apr. 3, 2013.

U.S. Appl. No. 13/359,726, filed Jan. 27, 2012; Aaron Irvin; office action dated Apr. 5, 2013.

1999 Catalogue; Canadian Tire; 2 pages.

3M, Product Bulletin PIJ180/180C, Release G, Effective Oct. 2008; 12 pages.

Cellgells Stick Almost Anywhere—Cell Phones, Music Devices, Laptops, Helmets, Cars . . . ; http://www.celgells.com; 1 page; as accessed on Jun. 5, 2009.

Crown Products; 2002; www.crownprod.com.

Dashmat Ultimate the Revolutionary Breakthrough Dashboard Cover; Saddleman Inc. 1998; 2 pages.

Egrips® Non-slip! Technology, http://www.egrips.com/technology; 2 pages; as accessed on Nov. 19, 2009.

Egrips® Non-slip! Technology; http://egrips.com/ ;3 pages; as accessed on Jun. 22, 2009.

Egrips® Non-slip! Technology, http://egrips.com/faq; 3 pages; as accessed on Jun. 22, 2009.

FNN-Fleet NewsNet: Company Car Fleet Management Solutions; p. 1-4; Roadtest; www.fleetnewsnet.co.uk.

General Electric "Friction Pad Kit" Instructions Field Made for MPD, MPD Friction Pad; Aug. 19, 1988.

Grip N Stay, It's Time to Get a Grip; http://www.gripnstay.com/catalog/index.php?main_page=index; 1 page; as accessed on Dec. 4, 2009.

http://bracketron.com/index.php?catied=16&pid=24; Bracketron, Inc.; Nav-Mat Portable GPS Dash Mount; as accessed Nov. 2009; 2 pages.

http://www.bracketron.com/?catid=11; bracketron Inc.; GPS Accessories; as accessed Nov. 2009; 2 pages.

http://www.bracketron.com/?includes/phpThumb/phpThumb.php?src-../../_products/UFM-100B . . . ; Bracketron Inc.; NavMat; as accessed Nov. 2009; 1 page.

Non-Slip Grip-it-Strips® fro Laptops; 1 page; 2010.

U.S. Appl. No. 13/045,057, filed Mar. 10, 2011; Alan J. Wheatley, office action issued Jun. 3, 2011.

U.S. Appl. No. 12/987,662, filed Jan. 10, 2011; Alan J. Wheatley.

U.S. Appl. No. 13/045,094, filed Mar. 10, 2011; Alan J. Wheatley; office action issued Jul. 1, 2011.

U.S. Appl. No. 10/791,304, filed Mar. 1, 2004; Alan J. Wheatley.

U.S. Appl. No. 12/979,690, filed Dec. 28, 2010; Alan J. Wheatley.

* cited by examiner

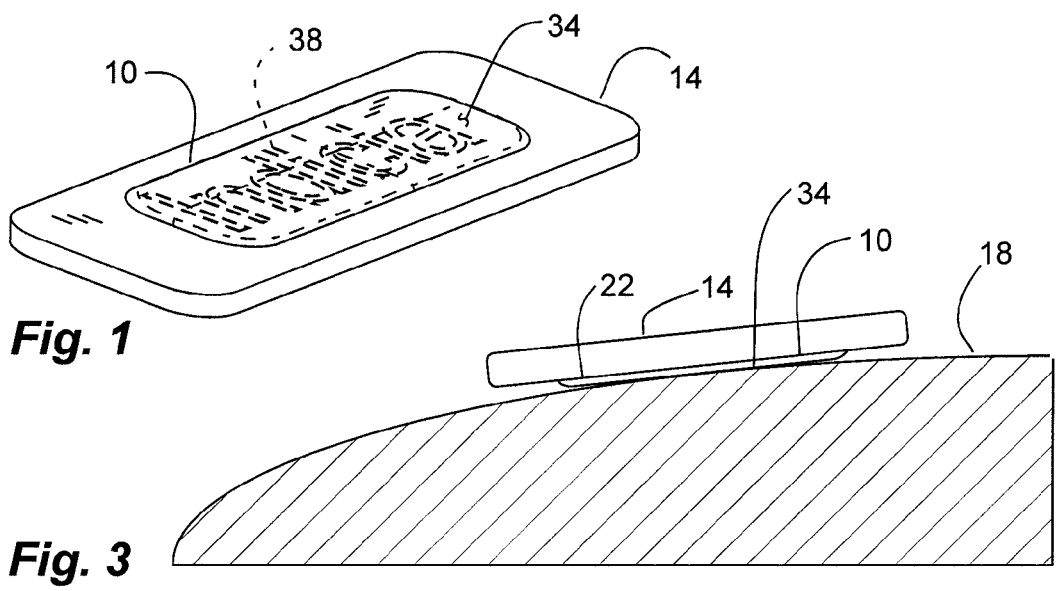
Fig. 1
Fig. 3
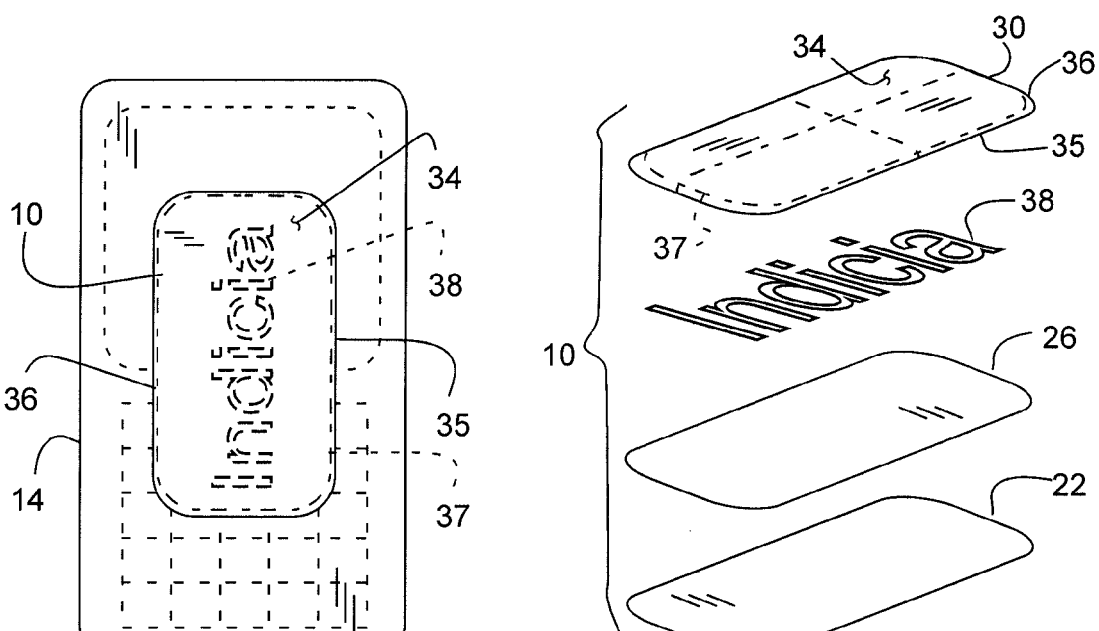
Fig. 2
Fig. 5
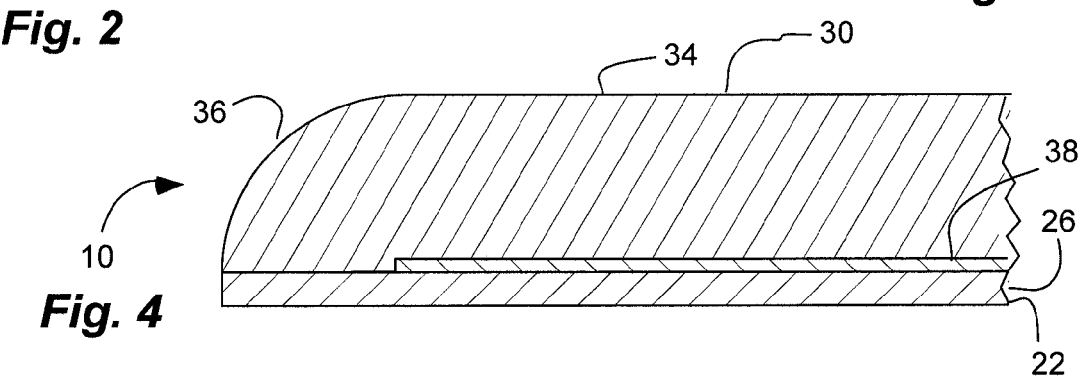
Fig. 4

FRICTION PAD ON PORTABLE HANDHELD ELECTRONIC DEVICE

PRIORITY CLAIM

Priority is claimed to copending U.S. Provisional Patent Application Ser. No. 61/290,615, filed Dec. 29, 2009, which is hereby incorporated herein by reference in its entirety.

Priority is claimed to copending U.S. Provisional Patent Application Ser. No. 61/371,853, filed Aug. 9, 2010, which is hereby incorporated herein by reference in its entirety.

RELATED PATENT(S)/APPLICATION(S)

This is related to U.S. Pat. Nos. 6,673,409; 7,125,602; and 7,252,867; and US Patent Publication Nos. 2009-0004420; 2006-0121250 and 2010-0001151; which are hereby incorporated herein by reference in their entirety. This is also related to U.S. patent application Ser. No. 12/979,690, filed Dec. 28, 2010, which is hereby incorporated herein by reference in its entirety.

BACKGROUND

1. Field of the Invention

The present invention relates generally to a frictional pad to be adhered to a portable handheld electronic device to substantially retain the device on an upwardly facing surface.

2. Related Art

Frictional holding pads have been developed for placing on a horizontal surface to hold and retain a handheld item without adhesive. For example, see U.S. Pat. Nos. 6,673,409; 7,125,602; and 7,252,867; and US Patent Publication No. 2009-0004420.

Other pads have been developed for placing on the handheld item itself. For example, see Egrips® anti-skid silicon skins or appliqués; GripNStay® adhesive grips; Grip-It-Strips® slip resistant textured strips with self adhesive backing; US Patent Publication Nos. 2006-0121250; 2006-0198978; 2006-0154029; 2005-0271847; and U.S. Pat. No. 6,117,526. See also U.S. Pat. Nos. 4,986,496; 5,508,084; 6,372,323 and 6,610,382. Stickers or decals have been developed that can be applied to cell phones. For example, see CellGells™ adhesive decals. Another pad has been developed that is tacky and clings to the handheld item. For example, see Gadget Grips® frictional pads by HandStands® and US Patent Publication No. 2006-0121250.

SUMMARY OF THE INVENTION

It has been recognized that it would be advantageous to develop a frictional pad securable to a handheld portable electronic device capable of non-mechanically and non-chemically or non-adhesively retaining the electronic device on an upwardly facing surface by the frictional pad.

The invention provides a frictional pad in combination with a handheld electronic device upon which the frictional pad is adhered and an upward facing support surface upon which the handheld electronic device is selectively disposed and held in a non-adhesive, non-slip fashion by the frictional pad. The frictional pad includes an adhesive film adhered to a surface of the handheld electronic device. A polyurethane dome is affixed to the adhesive film and adhered to the handheld electronic device by the adhesive film. The dome has a broad, flat shape with an outfacing surface facing the upward facing support surface with a flat and smooth center parallel with the adhesive film and surrounded by a radius perimeter. The outfacing surface of the dome contacts the upward facing support surface and is tacky to releasably hold the handheld electronic device to the upward facing support surface. The polyurethane dome includes polyol and catalyst in a ratio of between 0.63 and 0.85.

In accordance with a more detailed aspect of the present invention, the dome can have a hardness between 10 and 35 Shore D, or between 12 and 21 Shore D. In addition, the outfacing surface of the dome can have a coefficient of friction of between 0.3 and 0.1 in accordance with ASTM D 1894. Furthermore, the pad can have a thickness between the outfacing surface and the adhesive film of between 1-2 mm.

In accordance with a more detailed aspect of the present invention, the dome can be translucent or transparent. A graphic layer can be disposed between the adhesive film and the dome, and visible through the dome.

In addition, the invention provides a method for selectively securing a handheld electronic device to an upward facing support surface and selectively storing the handheld electronic device in a pocket of clothing or a clothing accessory. An adhesive film of a frictional pad is adhered to the handheld electronic device. The pad includes a polyurethane dome adhered to the handheld electronic device by the adhesive film, and a graphic layer disposed between the adhesive film and the dome and visible through the dome, the dome being translucent or transparent. The handheld electronic device is placed on the upward facing support surface with an outfacing surface of the dome of the pad facing and contacting the upward facing support surface. The outfacing surface is formed by the dome having a broad, flat shape with a flat center parallel with the adhesive film and surrounded by a radius perimeter. The polyurethane dome includes polyol and catalyst in a ratio of between 0.63 and 0.85. The handheld electronic device is removed from the support surface and placed the in the pocket of clothing or a clothing accessory. The handheld electronic device is removed from the pocket of clothing or a clothing accessory.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a perspective view of a frictional pad in accordance with an embodiment of the present invention shown on a handheld portable electronic device;

FIG. 2 is a top view of the frictional pad of FIG. 1 shown on a back surface of the electronic device;

FIG. 3 is a side view of the frictional pad and electronic device of FIG. 1 shown on an upwardly facing surface, such as a dashboard on console of a vehicle;

FIG. 4 is a partial cross-sectional view of the frictional pad of FIG. 1;

FIG. 5 is an exploded perspective view of the frictional pad of FIG. 1;

DETAILED DESCRIPTION OF EXAMPLE EMBODIMENT(S)

Figure 6:
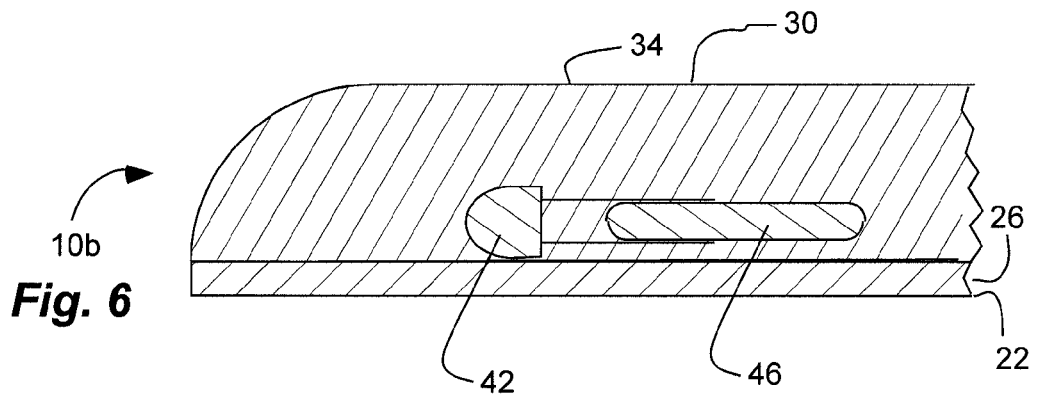
FIG. 6 is a partial cross-sectional view of another frictional pad in accordance with another embodiment of the present invention.

As illustrated in FIGS. 1-5, a frictional pad, indicated generally at 10, in an example implementation in accordance with the invention is shown disposed on and/or adhered to a handheld portable electronic device 14 to retain the device on an upwardly facing surface 18. The handheld portable electronic device 14 can be a cell phone; an MP3 player (iPod® or the like) or other digital music player; a gaming device (Nintendo® DS; PSP®; etc.); a camera; a global positioning system (GPS) system; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, iPad®, or the like); a radar detector; an e-book or e-reader (Kindle®, Nook®, iPad®, Sony Reader™, or the like), etc. The handheld portable electronic device can be mobile and transportable. The handheld portable electronic device can be carried by a user, such as in a pocket or purse, and also can be held in the user's hand(s). The handheld portable electronic device can also be deployed in a vehicle, such as removed from a pocket or purse, and from the user's hand. Thus, the upwardly facing surface 18 can be a dashboard or console or armrest of a vehicle. For example, the handheld portable electronic device can be a cell phone or smart phone that a user utilizes in his or her hand during use and/or while traveling, carries in his or her pocket or purse when not in use (and/or while in use in some instances), and is desired to be accessible and/or visible when traveling in a vehicle, such as if utilizing a GPS or map function or a smart phone. The upwardly facing surface faces generally upwardly, and can be inclined or horizontal, and can be flat or curved in one or more directions. The upwardly facing surface can be mobile or displaceable, and subject to acceleration (and deceleration and/or centripetal), and/or impact or bumps, such as a vehicle surface. Movement, momentum and/or acceleration or changes therein can be transferred from the upwardly facing surface to the handheld portable electronic device through the frictional pad. The pad 10 can be adhered to a surface, such as a back surface, of the electronic device 14, and selectively disposed and held in a non-adhesive, non-slip fashion on the surface 18 by the frictional pad.

The frictional pad 10 can include an adhesive film 22 adhered to the surface of the electronic device 14. The adhesive film can use a chemical adhesive to adhere. The adhesive can be selected to provide sufficient adhesion between the pad and device without separating as the device and pad are repeatedly inserted and removed from a pocket of clothing or a clothing accessory (e.g. a purse). The adhesive can also be selected so that the pad can be removed if desired. Thus, the adhesive film can include a releasable adhesive, as opposed to a permanent adhesive. The adhesive film can be a repositionable adhesive film releasably and repositionably adhered to the handheld device. The adhesive film can have an adhesive bond between the pad and the handheld portable electronic device. The adhesive film also has a contact surface between the adhesive film or pad and the handheld portable electronic device. Furthermore, the adhesive and/or the adhesive film can be substantially transparent, or at least translucent, so that the surface of the device can be visible through the pad. The adhesive and/or adhesive layer can be a removable 3M Controltac™ adhesive.

The adhesive film 22 can be disposed on a substrate 26. The substrate 26 can also be a film. In one aspect, the substrate can be substantially non-absorbent. The substrate can provide a surface, such as an upper or inner surface opposite the adhesive that can be printable. In addition, the substrate can be substantially transparent, or at least translucent, so that the surface of the device can be visible through the pad. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can have be other films with other characteristics, such as reflective, metal shine, textured, etc.

A dome 30 is affixed to the adhesive film 22 and/or substrate 26, and adhered to the electronic device 14 by the adhesive film. The dome 30 is secured to the adhesive film and/or substrate. The dome can have a broad, flat, squat shape with an outfacing surface 34 that faces and contacts the support surface. The outfacing surface can be smooth and flat and parallel with the adhesive layer. In addition, the outfacing surface can be surrounded by a radius perimeter 36. Thus, the perimeter of the outfacing surface curves toward the adhesive layer and electronic device. In one aspect, all of the outracing surface 34 can be flat and smooth and continuous between the radiused perimeter. The dome, pad and/or outward facing surface can be tacky to cling to the electronic device, such as by mechanical or specific adhesion. Furthermore, the pad can be substantially transparent, or at least translucent, so that the surface of the device can be visible through the pad. The dome can be formed of polyurethane.

The dome 30 or the outfacing surface 34 thereof provides a non-slip surface that can engage the support surface 18 and retain or hold the electronic device 14 on the upward facing support surface. Thus, the outfacing surface 34 can be sufficiently tacky to cling to the surface 18, but sufficiently smooth or slippery to slid in and out of pockets of clothing and clothing accessories. The tackiness of the outfacing surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 0.63 to 0.85, so that there is more polyol than catalyst. In another aspect, the ratio of polyol to catalyst can be between 0.63 to 0.75. Typical polyurethane is obtained by mixing polyol and catalyst in a 1:1 ratio. In addition, in one aspect, the outfacing surface 34 or dome 30 can have a hardness between 10 and 35 Shore D. In another aspect, the outfacing surface 34 or dome 30 can have a hardness between 12 and 21 Shore D. In another aspect, the outfacing surface 34 or dome 30 can have a hardness between 12 and 18 Shore D. Other non-tacky stickers or decals typically can have a hardness of 60 Shore D or harder. Furthermore, the outfacing surface 34 can have a coefficient of friction of between 0.3 and 0.1 in accordance with ASTM D 1894. Thus, the outwardly facing surface can be tacky to cling to the upwardly facing surface, but smooth to facilitate insertion and removal from a pocket or purse.

A strength of the adhesive bond between the adhesive film and the handheld portable electronic device can be greater than a tacky cling between the outfacing surface of the pad and the upward facing support surface. Thus, the pad remains on the device while the device and pad are removed from the support surface. In addition, the contact surface between the adhesive layer of the pad and the handheld electronic device can be greater than the outfacing surface of the pad contacting the support surface to further retain the pad on the device as the device and pad are removed from the support surface. Furthermore, the contact surface between the adhesive layer of the pad and the device can have a perimeter 35 greater than and circumscribing a perimeter 37 of the outfacing surface of the pad that contacts the support surface.

A graphic layer 38 can be disposed between the adhesive film 22 and the dome 30, or between the substrate 26 and the dome 30. The graphic layer can include ink disposed on or printed on the substrate. For example, the graphic layer can be an aqueous based inkjet ink. The graphic layer can include indicia, such as a logo, a picture, etc. In addition, the graphic layer can include directions for use, orientation, care, etc. Furthermore, the graphic layer can be or can include other inclusions, as described in greater detail below. The graphic layer 38 can be visible through the dome 30. The graphic layer and/or inclusion can be smaller or can have a smaller size than the substrate and dome such that the graphic layer and inclusion are surrounded by a perimeter of the dome and substrate.

The pad 10 can have a rectangular shape with rounded corners, as shown. Alternatively, other shapes are possible, such as circular or scripted (i.e. shaped-like letters). In one aspect, the pad is smaller than the surface of the electronic device to which it is applied. In addition, the pad 10 can have a thickness between 1-2 mm in one aspect, and 1.2-1.5 mm in another aspect. The thickness of the pad is dimensionally stable so that the pad is not generally compressible. The pad can have a stiffness with a self-supporting flat layer, yet can be flexible enough to be bent to conform to a curvature of the electronic device. The adhesive layer can be sufficient to overcome the stiffness of the pad and maintain the curved or bent nature of the pad when adhered to the device. In addition, the pad can be elastic to return to its self-supporting flat layer. The pad and the outfacing surface can be substantially solid, flat, smooth and continuous.

Figure 7:
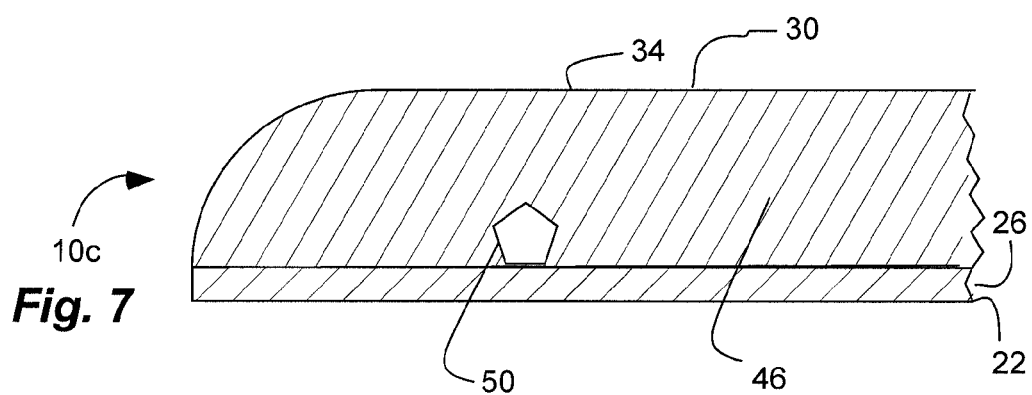
FIG. 7 is a partial cross-sectional view of another frictional pad in accordance with another embodiment of the present invention.

As indicated above, the graphic layer 38 can be or can include an inclusion. The inclusions can be embedded in the dome. For example, the graphic layer can be an etched metallic layer 42. The metallic layer can be etched to form the indicia. Other inclusions can be an LED (or other light source) and a battery power source; a hologram or lenticular artwork; an RFID computer chip or tag; a mirror; one or more gems or faux gems; etc. For example, referring to FIG. 6, another frictional pad 10b as described above is shown with an LED 42 electrically coupled to a battery 46. The LED may remain continuously activated or lit. Alternatively, the LED may be activated, or the leads for the LED selectively contacted by the battery, such as by pressure applied to the pad. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome. As another example, referring to FIG. 7, another frictional pad 10c as described above is shown with a gem or faux gem 50 embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material.

Figure 8:
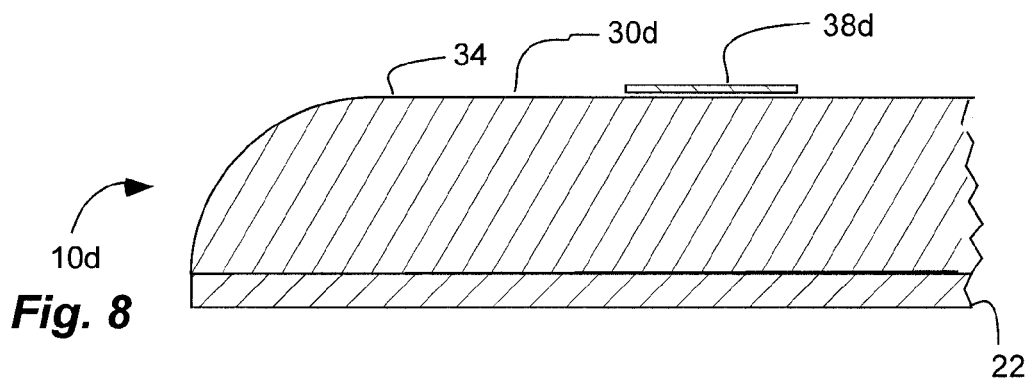
FIG. 8 is a partial cross-sectional view of another frictional pad in accordance with another embodiment of the present invention.

Referring to FIG. 8, another frictional pad 10d which is similar in many respects to those described above, can have an opaque dome 30d with a graphic layer 38d, such as printing, on the outfacing surface 34. The opaque dome 30d can have a color to match or complement the handheld device.

As mentioned above, the pad can have any shape. In addition, the pad can be "scripted," i.e. shaped as particular letters, symbols, etc.; which can be interconnected or can be one or more separate and discrete portions.

As discussed above, the dome or outfacing surface can have a radius perimeter. The pad can be made by pouring the polyurethane material on top of the substrate and graphic layer to form the dome. Thus, the radius perimeter is obtained by individual pouring each pad or dome, without stamping or cutting the pads from a continuous layer. The graphic layer can be printed on the substrate having the adhesive film opposite the graphic layer. The graphic layer can be a discrete graphic contained within the pad or dome, as opposed to a continuous graphic.

In use, the adhesive film of the pad can be adhered to the electronic device in a desired location. The electronic device, with the pad thereon, can be placed on the upward facing support surface with the outfacing surface contacting the support surface. The electronic device, with the pad thereon, can be removed from the support surface and placed in a pocket of clothing or a clothing accessory. The electronic device, with the pad thereon, can be removed from the pocket and placed on the support surface. The above described dome and outfacing surface of the pad are sufficient to cling to the support surface, without hampering removal from the pocket or picking up lint or other unwanted items.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A frictional pad in combination with a handheld electronic device upon which the frictional pad is adhered and an upward facing support surface upon which the handheld electronic device is selectively disposed and held in a non-adhesive, non-slip fashion by the frictional pad, the frictional pad comprising:
   a) an adhesive film adhered to a surface of the handheld electronic device;
   b) a polyurethane dome affixed to the adhesive film and adhered to the handheld electronic device by the adhesive film;
   c) the dome having a broad, flat shape with an outfacing surface facing the upward facing support surface with a flat and smooth center parallel with the adhesive film and surrounded by a radius perimeter;
   d) the outfacing surface of the dome contacting the upward facing support surface and being tacky to releasably hold the handheld electronic device to the upward facing support surface; and
   e) the polyurethane dome being formed by a polyol and a catalyst in a ratio of between 0.63 and 0.85.

2. The combination in accordance with claim 1, wherein the dome has a hardness between 10 and 35 Shore D.

3. The combination in accordance with claim 1, wherein the outfacing surface of the dome has a coefficient of friction of between 0.3 and 0.1 in accordance with ASTM D 1894.

4. The combination in accordance with claim 1, wherein the dome is translucent or transparent; and further comprising a graphic layer disposed between the adhesive film and the dome and visible through the dome.

5. The combination in accordance with claim 4, further comprising:
a film with the adhesive film on one side; and
the graphic layer printed on the other side.

6. The combination in accordance with claim 4, wherein the graphic layer further comprises an etched metallic layer.

7. The combination in accordance with claim 4, further comprising:
a substrate with the adhesive film on one side and the graphic layer printed on the other side; and
the substrate is at least translucent so that the entire pad except for the graphic layer is translucent or transparent, and the support surface is visible therethrough.

8. The combination in accordance with claim 4, wherein the graphic layer includes a hologram.

9. The combination in accordance with claim 4, wherein the graphic layer includes a mirror surface.

10. The combination in accordance with claim 1, wherein the dome is translucent or transparent, and further comprising:
an LED and a battery power source embedded within the polyurethane dome.

11. The combination in accordance with claim 1, further comprising:
an inclusion embedded within the polyurethane dome, the inclusion including a gem.

12. The combination in accordance with claim 1, wherein the pad has a thickness between the outfacing surface and the adhesive film of between 1-2 mm.

13. The combination in accordance with claim 1, wherein the polyurethane dome includes a scented material permeable through a polyurethane material of the dome.

14. The combination in accordance with claim 1, wherein the pad forms a rigid, self-supporting layer.

15. The combination in accordance with claim 1, wherein all of the outfacing surface of the pad between the radius perimeter is flat and smooth and continuous.

16. The combination in accordance with claim 1, wherein a strength of an adhesive bond between the adhesive film of the pad and the handheld electronic device is greater than a tacky cling between the outfacing surface of the pad and the upward facing support surface.

17. The combination in accordance with claim 1, wherein a contact surface between the adhesive layer of the pad and the handheld electronic device is greater than the outfacing surface of the pad contacting the upward facing support surface.

18. The combination in accordance with claim 1, wherein a contact surface between the adhesive layer of the pad has a perimeter greater than and circumscribing a perimeter of the outfacing surface of the pad contacting the upward facing support surface.

19. A method for using the combination in accordance with claim 1, comprising:
selectively placing the handheld electronic device on the upward facing support surface with the outfacing surface contacting the upward facing support surface; and
selectively placing the handheld electronic device with the frictional pad thereon into a pocket of clothing or a clothing accessory.

20. A frictional pad in combination with a handheld electronic device upon which the frictional pad is adhered and an upward facing support surface upon which the handheld electronic device is selectively disposed and held in a non-adhesive, non-slip fashion by the frictional pad, the frictional pad comprising:
a) an adhesive film adhered to a surface of the handheld electronic device;
b) a polyurethane dome adhered to the handheld electronic device by the adhesive film;
c) the dome having a broad, flat shape with an outfacing surface facing the upward facing support surface with a smooth and flat center parallel with the adhesive film and surrounded by a radius perimeter;
d) the outfacing surface contacting the upward facing support surface and being tacky to releasably hold the handheld electronic device to the upward facing support surface;
e) the polyurethane dome includes a polyurethane material being formed by a polyol and a catalyst in a ratio of 0.63 to 0.85;
f) the dome being translucent or transparent;
g) a graphic layer disposed between the adhesive film and the dome and visible through the dome;
h) the outfacing surface of the dome having a coefficient of friction of between 0.3 and 0.1 in accordance with ASTM D 1894;
i) the dome having a hardness between 12 and 21 Shore D; and
j) the pad has a thickness between the outfacing surface and the adhesive film of between 1-2 mm.

21. The combination in accordance with claim 20, further comprising:
a film with the adhesive film on one side and the graphic layer printed on the other side.

22. The combination in accordance with claim 20, wherein the graphic layer further comprises an etched metallic layer.

23. The combination in accordance with claim 20, further comprising:
a substrate with the adhesive film on one side and the graphic layer printed on the other side; and
the substrate is translucent or transparent so that the entire pad except for the graphic layer is at least translucent and the support surface is visible therethrough.

24. A frictional pad in combination with a handheld electronic device upon which the frictional pad is adhered and an upward facing support surface upon which the handheld electronic device is selectively disposed and held in a non-adhesive, non-slip fashion by the frictional pad, the frictional pad comprising:
a) an adhesive film adhered to a surface of the handheld electronic device;
b) a polyurethane dome affixed to the adhesive film and adhered to the handheld electronic device by the adhesive film;
c) the dome having a broad, flat shape with an outfacing surface facing the upward facing support surface with a flat and smooth center parallel with the adhesive film and surrounded by a radius perimeter;
d) the outfacing surface of the dome contacting the upward facing support surface and being tacky to releasably hold the handheld electronic device to the upward facing support surface;
e) the outfacing surface of the dome having a coefficient of friction of between 0.3 and 0.1 in accordance with ASTM D 1894; and
f) the dome having a hardness between 12 and 21 Shore D.

25. The combination in accordance with claim 24, further comprising:

the polyurethane dome being formed by polyol and catalyst in a ratio of between 0.63 and 0.85.

* * * * *